May 5, 1936.  J. A. SPENCER  2,039,358

THERMALLY OPERATED VALVE

Filed July 14, 1934  2 Sheets-Sheet 1

John A. Spencer, Inventor,
Delos F. Haynes, Attorney.

May 5, 1936. J. A. SPENCER 2,039,358

THERMALLY OPERATED VALVE

Filed July 14, 1934 2 Sheets-Sheet 2

John A. Spencer,
Inventor,
Deloe F. Haynes
Attorney.

Patented May 5, 1936

2,039,358

UNITED STATES PATENT OFFICE 2,039,358

THERMALLY OPERATED VALVE

John A. Spencer, Newtonville, Mass., assignor to General Plate Company, Attleboro, Mass., a corporation of Massachusetts Application July 14, 1934, Serial No. 735,215

2 Claims. (Cl. 236—80)

This invention relates to thermally operated valves, and with regard to certain more specific features, to thermally operated diaphragm-type valves.

Among the several objects of the invention may be noted the provision of a thermally operated valve wherein a ready and simple method of adjusting the temperature of operation of the valve is embodied; a valve of the class described which is quick in its response to change of temperature conditions; and the provision of a valve of the class described which is relatively simple in construction and reliable in operation. Other objects will be in part obvious and in part pointed out hereinafter.

The invention accordingly comprises the elements and combinations of elements, features of construction, and arrangements of parts which will be exemplified in the structures hereinafter described, and the scope of the application which will be indicated in the following claims.

Figure 1:
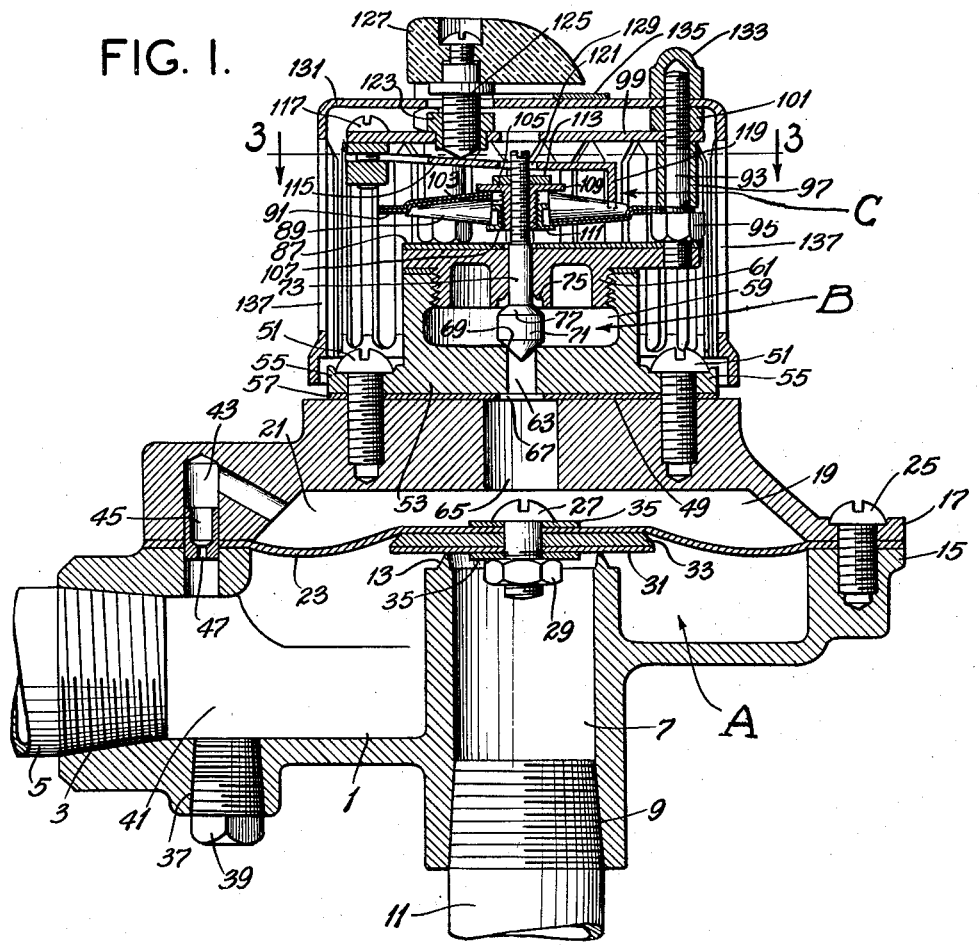
Figure 3:
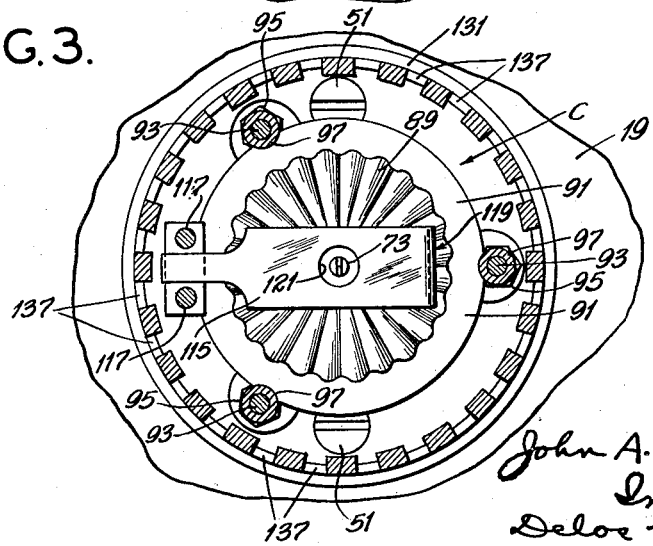
Figure 2:
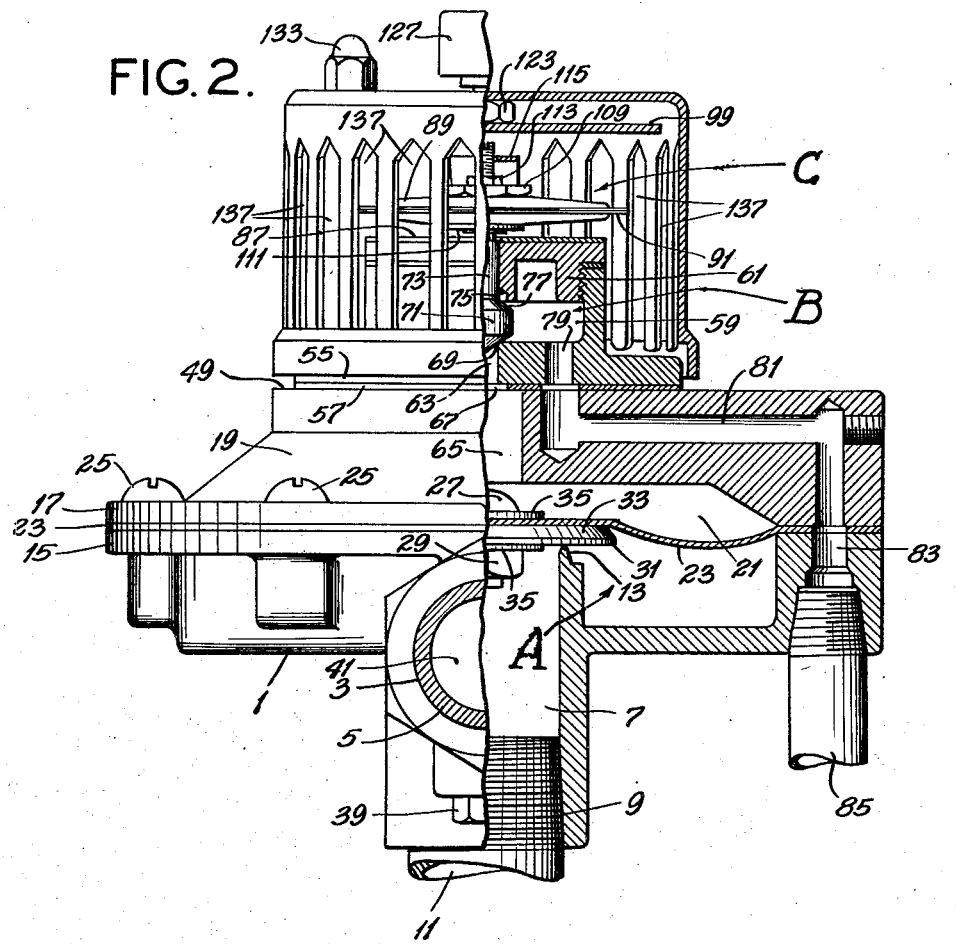

In the accompanying drawings, in which is illustrated one of various possible embodiments of the invention, Fig. 1 is an axial section of a valve embodying the present invention;

Fig. 2 is partly another axial section of the valve of Fig. 1, but taken at 90° from the angle of Fig. 1, and partly an elevation of the valve of Fig. 1; and Fig. 3 is a horizontal cross section taken substantially along line 3—3 of Figures 1 and 2.

Similar reference characters indicate corresponding parts throughout the several views of the drawings.

Referring now more particularly to Fig. 1, it will be seen that the present invention comprises a diaphragm valve assembly indicated broadly by index-character A, a bleeder valve assembly B, and a thermostatic control C for the bleeder valve B. In the operation of the invention, which will be elucidated in considerably more detail hereinafter, the bleeder valve B, which is operated by the thermostatic control C in response to temperature variations, constitutes a relay system causing operation of the diaphragm valve A. For facility of description, the diaphragm valve A will first be described in detail.

Numeral 1 indicates the lower half of a valve casing, which is generally circular in shape. Leading into one side of the casing 1 is an inlet 3, which, in assembly, receives a line pipe. A vertical tubular portion 7 is provided at the center of the casing 1, the lower end of which is threaded to comprise the valve outlet, as indicated at numeral 9, which receives an outlet pipe 11. The upper end 13 of the tubular portion 7 is formed as a valve seat. The upper periphery of the casing 1 is provided with a flange 15 (see also Fig. 2) which juxtaposes a similar flange 17 on the upper half 19 of the valve casing. The upper casing member 19 is likewise circular, and is interiorly hollow to provide a chamber 21. Between the flanges 15 and 17 is clamped the periphery of a circular diaphragm 23. Studs 25 hold the two halves of the casing together and provide the clamping means by which the diaphragm 23 is secured in position.

A bolt 27, together with its nut 29, secures to the center of the diaphragm 23 a valve closure element 31, which is positioned to seat upon the valve seat 13. Between the closure element 31 and the diaphragm 23 are a weight member 33 and gaskets 35 which serve to prevent fluid leakage around the bolt 27.

A threaded outlet 37 provides means for connecting a conduit for the supply of a pilot burner for ignition purposes at the main burner, but is closed by a plug 39 when no such connection is made.

Connecting the chamber 41 of the lower valve casing 1 and the chamber 21 of the upper casing 19 is a passage 43, which has inserted therein an orifice member 45. The orifice member 45, which is of usual construction, has an opening 47 therethrough through which gas may pass, but only at a comparatively slow rate.

The upper casing member 19 is provided with a flat portion 49, upon which is mounted the bleeder valve and thermostatic control assemblies B and C, respectively. Studs 51 secure a body portion 53, having an outwardly extending flange 55, to said flat portion 49, a gasket 57 being interposed therebetween to secure a gas-tight connection. The body 53 is generally cup-shaped, having an inner chamber 59 therein. The upper end of the body 53 is interiorly threaded to receive a closure 61. A passage 63 leads downwardly from the chamber 59 to connect with a similarly positioned passage 65 in the upper valve casing member 19 (a suitable opening 67 in the gasket 57 being provided).

The intersection of the passage 63 and the chamber 59 provides a circular valve seat 69, against which closes a valve closure element 71 of customary conical form, which is carried at the lower end of a stem 73. The stem 73 slides in a suitable bore in the closure 61. A valve seat 75 is likewise provided in the closure 61, against which seats a reverse conical portion 77 on the valve closure element 71; this arrangement providing for back-seating of the bleeder valve.

Referring more particularly to Fig. 2, there is provided a passage 79 leading from the chamber 59, and coinciding with a passage 81 in the upper valve casing 19, which in turn coincides with a passage 83 in the lower valve casing 1. This passage 79—81—83 comprises a bleeder line, and preferably leads through a bleeder line 85 to a region of relatively lower pressure (such as, for example, the chamber in the burner whose supply system the present valve is regulating), or to a bleeder burner positioned adjacent the pilot burner so that the bleeder gas will be ignited and consumed.

Mounted atop the flat upper surface of the closure 61 is the thermostatic control C. It is desirable, in order to protect the thermostatic elements from the heat- (or cold-) storage of the valve body, that a layer of heat insulation 87 be secured directly to the top of closure 61, and the control elements mounted thereon, but such provision is not absolutely essential. The important element of the thermostatic control comprises a composite thermostatic metal, radially corrugated disc 89, of the general type shown in John A. Spencer Patent 1,895,591, issued January 31, 1933. This disc is, under one set of temperature conditions, conical in one direction; upon changes of temperature, it snaps to an oppositely directed conical conformation. For example, in the present embodiment, under cold temperature conditions, the disc is conical upwardly, but as the temperature rises past a predetermined value, it snaps to a hot, downwardly-conical position. In certain cases it may be found preferable to use the composite thermostatic metal disc shown in John A. Spencer Patent 1,448,240 issued March 13, 1923.

The disc 89 has a smooth peripheral region 91 by which it is mounted. Three studs 93 are threaded into the top of closure 61. A nut 95 is then drawn down on each stud. The placement of the studs is such that the periphery 91 of the disc 89 rests upon these three nuts 95. Sleeves or collars 97 are then slipped on the studs 93, the periphery 91 being positioned between the nuts 95 and sleeves 97, a raised shoulder on the nuts 95, slightly higher than the thickness of the disc edge 91, keeping the disc from being tightly bound. A plate 99 is next placed in position on the studs 93, and the nuts 101 clamp all of these elements in one position.

The disc 89 is provided with a central hole or opening 103, through which passes the threaded upper end of stem 73 of the bleeder valve closure element 71. A pair of concentrically threaded nuts or collars 105 and 107, which have outwardly directed flanges 109 and 111, respectively, engage the stem 73 and the flanges 109 and 111 loosely embrace the inner periphery of the disc 89 therebetween. A lock nut 113 secures the collars 105 and 107 in position on the stem 73. By these means the thermostatic displacement of the central portion of the disc 89 reciprocates the valve stem 73 on its axis, and hence operates the bleeder valve.

The thermostatic disc 89 is subject, in operation, to two adjustments, namely, adjustment of the operating differential and adjustment of the operating temperature. The operating differential of the disc constitutes the difference between the temperature that it snaps from cold to hot position upon increase of temperature, and the temperature that it snaps from hot to cold position upon decrease of temperature. As is explained in more detail in the copending application of John A. Spencer, Serial No. 637,854, now Patent No. 1,972,832, filed October 14, 1932, and entitled "Thermostatic control", this operating differential may be controlled by limiting the extent of movement of the central, movable portion of the disc 89 between its hot and cold positions, and by shifting the point of bearing of a spring 115 on the disc 89, both of these means being used when a very small differential is desired. In the present invention, the differential is set once and for all in the factory assembly of the valve, and no means are provided for external differential adjustment. The limitation of the extent of movement of the central movable part of the disc is achieved by restricting the degree of movement permitted between the direct and back-seated positions of the bleeder valve closure element 71. The required degree of factory adjustment is here provided by the extent to which the closure element 61 is threaded into the body 53. Since the disc 89 is mechanically coupled for movement with the stem 73 of the valve closure element 71, restriction of the extent of movement of said closure element is likewise a restriction of the extent of movement of the disc 89. The final differential adjustment is effected by shifting leaf spring 115 into and out of the clamp supporting the same (after loosening bolts 117) so as to adjust the point of bearing of the leaf spring on the disc toward or away from the center of the disc. The particular structure and function of the leaf spring 115 is brought out hereinafter.

Temperature control, as distinguished from differential control, is the control of the temperature at which the disc snaps in either direction. This control is achieved, in the present invention, as in said copending Spencer application, by the application of a variable resilient force to the movable region of the disc 89 tending to aid or oppose its snapping movement. This variable resilient force is provided by a resilient blade, or leaf-spring 115, one end of which is clamped by a pair of bolts 117 to the underside of the plate 99, and the other end of which is bent downwardly, as at numeral 119, to engage the surface of disc 89. A hole 121 in the blade 115 permits free passage of the valve stem 73. Threaded into a suitable nut 123 mounted in the plate 99 is a stud 125, the lower end of which bears against the upper surface of blade 115. The upper end of the stud 125 carries an adjusting knob 127 which has a pointer 129 thereon. It will readily be seen that threading the stud 125 into the plate 99 increases the resilient pressure on the disc 89, while threading the stud out of the plate 99 decreases the resilient pressure on the disc 89. Thus is the operating temperature of the disc varied.

The entire thermostatic control assembly C and the bleeder valve assembly B are encased in a cup-shaped cover portion 131, which is held in position by nuts 133 on the studs 93. Two of the nuts 133 act as stops to limit the arc through which adjusting knob 127 may be turned. A scale 135 is provided to cooperate with the pointer 129 on knob 127 to indicate the temperature for which the control is set to operate. The cover 131 is desirably provided with many openings 137 therethrough, so that air currents will maintain the region of the disc 89 at the ambient temperature surrounding the valve as a whole.

The operation of the invention as thus described is as follows:

The valve is assumed to be connected in a gas line, with the inlet 3 connected to provide line pressure in the lower chamber 41. It is also assumed, initially, that the thermostat 89 is in its hot, downwardly-conical position, thus holding the bleeder valve 71 closed.

Under these conditions, gas will leak through the passage 43 and orifice member 45 into the upper chamber 21, and therein build up a pressure equal to that in the chamber 41. Thus, with the pressure on each side of it the same, the diaphragm 23 will, under the influence of the weight 33, cause the valve closure element 31 to seat upon the valve seat 13, and thereby cut off the flow of gas to the outlet pipe 9.

However, if the ambient temperature drops past the temperature set by the knob 127, the disc 89 snaps over to its upwardly conical position, thus removing the valve closure element 71 from its seat 69 and permitting gas from chamber 21 to flow to chamber 59 and thence through passages 79, 81, and 83 to the bleeder burner (not shown). This means that the pressure in chamber 21 will at once drop, since the orifice member 45 prevents flow of gas from the chamber 41 in sufficient volume to keep up the pressure therein, and because of the now greater pressure on the under side of diaphragm 23, it will move upwardly and unseat the valve 31, thus permitting the flow of gas to the outlet pipe 9.

As soon as the ambient temperature reaches the required minimum, however, the bleeder valve 71 immediately closes and at once pressure is again built up in the chamber 21 to close the diaphragm valve again.

By setting the knob 127, the temperature at which the valve opens may readily be controlled throughout the desired range of values.

The valve as described is conditioned to operate so that it is open below a certain temperature, and closed above another certain temperature. The difference between these certain temperatures is the operating differential of the thermostat. If a reverse action is desired (that is, if it be desired that the valve be closed below a certain temperature and open thereabove), this can most readily be done by inverting the thermostatic disc 89, so that it is upwardly conical in its hot position, and downwardly conical in its cold position.

The construction may be arranged so that the valve 31 will be open when the disc is cold and closed when hot, or vice versa, as desired, by merely assembling the disc with the proper side up.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A thermally responsive diaphragm valve comprising a casing having inlet and outlet ports, a valve seat between said ports, a valve closure element adapted to seat on said valve seat, a flexible diaphragm carrying said closure element and separating said casing into a chamber including said inlet and outlet ports, and a second chamber, means providing a restricted passage connecting said chambers and a passage leading from said second chamber, a bleeder valve located in said second passage and adapted to control the relative fluid pressures in said two chambers, and temperature-responsive means for actuating said bleeder valve comprising a snap-acting thermostatic disc, said disc operating said bleeder valve in such manner that said bleeder valve passes substantially instantaneously between its fully opened and its fully closed positions.

2. A thermally responsive diaphragm valve comprising a casing having inlet and outlet ports, a valve seat between said ports, a valve closure element adapted to seat on said valve seat, a flexible diaphragm carrying said closure element and separating said casing into a chamber including said inlet and outlet ports, and a second chamber, means providing a restricted passage connecting said chambers and a passage leading from said second chamber, a bleeder valve located in said second passage and adapted to control the relative fluid pressures in said two chambers, and temperature-responsive means for actuating said bleeder valve comprising a snap-acting thermostatic disc, said disc operating said bleeder valve in such manner that said bleeder valve passes substantially instantaneously between its fully opened and its fully closed positions, and means for regulating the operating temperature and the operating differential of said disc.

JOHN A. SPENCER.